United States Patent [19]

Jones et al.

[11] 4,154,676

[45] *May 15, 1979

[54] ION EXCHANGE PROCESS USING ACTIVATED REGENERATED CELLULOSE

[75] Inventors: David T. Jones; Kenneth R. Rees; George E. Jowett, all of Swansea, Wales

[73] Assignee: Viscose Development Co., Ltd., England

[*] Notice: The portion of the term of this patent subsequent to Sep. 16, 1992 has been disclaimed.

[21] Appl. No.: 821,514

[22] Filed: Aug. 3, 1977

Related U.S. Application Data

[63] Continuation of Ser. No. 580,968, May 27, 1975, abandoned, which is a continuation-in-part of Ser. No. 273,766, Jul. 21, 1972, Pat. No. 3,905,954.

[30] Foreign Application Priority Data

Jul. 23, 1971 [GB] United Kingdom ............... 34645/71

[51] Int. Cl.² ............................................. B01D 15/04
[52] U.S. Cl. ................. 210/40; 260/112 R; 536/57
[58] Field of Search ................ 210/24, 30, 36, 500 R, 210/502, 504, 508, 40; 260/2.1 R, 2.2 R, 112 R; 536/57, 85, 87, 88

[56] References Cited

U.S. PATENT DOCUMENTS

| | | | |
|---|---|---|---|
| 2,739,906 | 3/1956 | Berry et al. | 210/36 |
| 3,573,277 | 3/1971 | Grant | 260/2.2 R |
| 3,697,419 | 10/1972 | Grant | 210/30 |
| 3,835,041 | 9/1974 | Grant | 210/30 |
| 3,905,954 | 9/1975 | Jones et al. | 210/500 R |

FOREIGN PATENT DOCUMENTS 1052621 12/1966 United Kingdom ...................... 536/57

Primary Examiner—Thomas G. Wyse
Assistant Examiner—Ivars Cintins
Attorney, Agent, or Firm—Kane, Dalsimer, Kane, Sullivan and Kurucz

[57] ABSTRACT

An ion exchange process is characterized by the use of an ion exchange cellulose made by reacting unregenerated cellulose with a monomeric substance having at least one ionizable chemical group which imparts ion exchange properties to the cellulose reaction product, and thereafter regenerating the activated cellulose reaction product to yield an activated regenerated cellulose having ion exchange properties.

13 Claims, No Drawings

ION EXCHANGE PROCESS USING ACTIVATED REGENERATED CELLULOSE

CROSS-REFERENCE TO RELATED APPLICATIONS

This application is a continuation of copending U.S. Application Ser. No. 580,968 filed May 27, 1975, which is now abandoned and was a continuation-in-part of then copending U.S. application Ser. No 273,766, filed on July 21, 1972 and now issued as U.S. Pat. No. 3,905,954.

BACKGROUND OF THE INVENTION

1. Field of the Invention

This invention relates to ion exchange processes using ion exchange materials comprising activated regenerated cellulose.

2. Brief Description of the Prior Art

An ion-exchange material in general consists of an inert polymer into which are introduced ionizable chemical groups which are normally basic or acidic in nature and capable of binding anions or cations, respectively, by a process analogous to salt formation. Such bound ions may be exchanged for different ions when the chemical environment of the material is changed.

Ion-exchange materials based on cellulose have been prepared by combining a suitable compound containing an ionizable chemical group with natural or regenerated cellulose. The hitherto proposed materials are, however, costly because of their expensive preparations and have other disadvantages.

A particular disadvantage of the hitherto proposed ion exchange materials based on natural or regenerated cellulose is their limited exchange capacity for relatively large ions, for example, ions derived from proteins or carbohydrates. Further, the previously proposed materials based on regenerated cellulose can be prepared satisfactorily in only a few physical forms. Thus, for example, difficulties arise in preparing an ion exchange material from cellulose that has been regenerated in the form of a sponge. The activating conditions tend to bring about a degradation of the sponge structure and produce a material in which the ion exchange active sites are irregularly distributed, and which as a tendency towards physical instability. Also, combination between the activating substance and the regenerated cellulose is mainly restricted to surface regions of the cellulose. Similar difficulties arise in activating cellulose that has been regenerated in other physical forms, for example, films.

The fibrous character of natural cellulose also imposes physical limitations, and restricts the range of applications for which ion exchange materials based thereon can be employed and renders such material unsuitable, for example, for the extraction of proteins from waste effluents.

SUMMARY OF THE INVENTION

The present invention is based on our appreciation that the properties and performance of ion exchange cellulose can be significantly improved if the reaction with ion exchange activating monomers is effected before regeneration of the cellulose into the end use physical form.

The invention accordingly provides an ion exchange process utilising an ion exchange material made by reacting unregenerated cellulose with a monomeric substance having at least one ionisable chemical group which imparts ion exchange properties to the cellulose reaction product, and thereafter regenerating the activated cellulose reaction product to yield an activated regenerated cellulose having ion exchange properties.

DETAILED DESCRIPTION OF THE INVENTION

The process used to make ion exchange celluloses for use in the process of the invention enables such activated regenerated celluloses to be obtained in a wide variety of physical forms, including many that have hitherto been difficult or impossible to attain. Further, the activated regenerated cellulose is generally obtained relatively economically and has superior absorption and/or ion exchange properties for large ions, especially polyelectrolyte ions. Examples of large ions which may be exchanged using activated regenerated cellulose in accordance with the invention include ions derived from proteins such as enzymes and components of blood and tissue; carbohydrates, for example, charged polysaccharides such as the mucopolysaccharides; nucleic acids, for example, ribonucleic acids and deoxyribonucleic acids; dyestuffs, for example, Congo Red; long-chain fatty acids; and quaternary ammonium compounds.

The term "monomer" is used herein to denote a chemical compound consisting of single (or associated) moieties, that is to say, a non-polymeric material, and is not to be understood as necessarily meaning a substance which is capable of undergoing polymerisation.

The term "regeneration" refers herein to the step of precipitating a dissolved cellulose into whatever physical form is desired.

Examples of activating monomers which may be used in the manufacture of ion exchange celluloses for use in the process of the invention include compounds containing amino, alkylamino, guanidino or quaternary amino groups for the preparation of anion-exchange materials, e.g. 2-amino ethyl chloride, 2-amino ethyl bromide, 2-amino methyl iodide, 2-amino alkyl sulphuric acids for instance the 2-amino ethyl compounds, diethylamino ethyl chloride, di(hydroxyethyl) amino ethyl chloride, dimethylamino ethyl chloride, 1-dialkyl 2-3 epoxy propanols for instance 1-(diethylamino)-2,3-epoxy propanol, 2-chloro triethylamine hydrochloride, 2-bromo triethylamine hydrobromide, p-amino benzyl chloride, O-methyl isourea, p-morpholino ethyl chloride and salts thereof; and compounds containing sulpho, phosphonic or carboxyl groups for cation-exchange materials, e.g. halogen alkyl sulphonates for instance chloromethane sulphonic acid, 2-chloro - or 2-bromo-ethane sulphonic acid or sodium monochloromethane sulphonate, ethylene sulphonic acid, ethionic acid; disodium chloromethyl phosphonate, chloromethyl phosphonic acid, methyl phosphonic acid dichloride, 2-chloroethyl phosphonic acid; and 1-3 alkyl sultones for instance, 1,3-propane sultone.

Compounds are also known which can be attached to cellulose to form materials capable of firm biologically active materials such as, for example, enzymes by ion exchange-type processes (see, for example, British Pat. No. 1,183,259), and the use of such compounds as monomeric activators is also included within the scope of the present invention. Thus, for example, the activating substance may be a compound of the formula

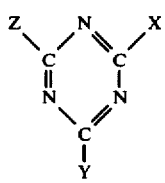

in which X and Z represent halogen atoms, especially chlorine and bromine, and Y represents a nucleophile for instance halogen or an amino group, and may be an aromatic or aliphatic group.

It will in most cases be preferable to cross-link the cellulose to some extent so as to obtain extra structural stability. Any of the cross-linking agents known in the art may be used for this purpose including, for example, epichlorhydrin, dichlorhydrin, dibromoethane, dichloroethane, 1,2-3,4-diepoxybutane, bisepoxy propyl ether, ethylene glycol bisepoxy propyl ether and 1,4-butanediol bisepoxy ether. The above-mentioned cross-linking agents are generally employed in alkaline solution, e.g. aqueous sodium hydroxide. It is also possible to use other chemical cross-linking agents such as aldehydes, e.g. formaldehyde, which are employed in acidic solution. Alternatively, cross-linking may be achieved photochemically by using ionising radiation such as ultraviolet radiation, gamma rays or electron beams, optionally in the presence of sensitizing chemicals. Cross-linking may be effected either simultaneously with the incorporation of the activating monomer, in which case the activation and cross-linking reactions should, of course, be such as can proceed without mutual interference, or may be carried out at another stage in the regeneration process. Instead, it may in some cases be advantageous to effect the cross-linking after the cellulose has been regenerated.

The properties of the ion exchange cellulose product will depend to some extent on the degree of cross-linking utilised, and the degree of cross-linking can be controlled in accordance with the final properties required. In general, however, the degree of cross-linking will be from 0.1 to 10%, especially from 1 to 10%, expressed in terms of the weight of cross-linking agent and the dry weight of the regenerated cellulose, although up to 30% may be required in order to obtain special properties. It will be appreciated that the degree of cross-linking selected in any given case will depend on the solubilising action of the monomeric activator and on the degree of substitution of the cellulose by that activator.

The viscose process for the preparation of regenerated cellulose can be modified to provide an especially preferred method of preparing an ion exchange cellulose for use according to the present invention. Thus, a preferred preparative method comprises the following steps:

1. Preparation of alkali cellulose. This can be achieved by any suitable method including the traditional one of soaking sheets of wood pulp in caustic soda, pressing out surplus caustic soda, and disintegrating the sheets to form crumbs of alkali cellulose. Instead, the alkali cellulose may be prepared by grinding natural cellulose to a powder and impregnating the powder with a limited quantity of caustic soda solution.

2. Treat with an activating monomer, for example, diethylchloromethylamine hydrochloride, and with a cross-linking agent such as epichlorhydrin.

3. Treat with caustic soda.

4. Treat with carbon disulphide.

5. Dissolve the product in a solution of caustic soda.

6. Precipitate in the required form by an appropriate regeneration method, for example, by the action of heat; by means of an acid; by treatment with a hot strong electrolyte; or by treatment with a strong electrolyte such as, for example, ammonium sulphate, followed by an acid. One or more reinforcing agents and/or pore-forming materials may be added prior to regeneration. Examples of reinforcing agents include hemp, flax, cottong, viscose yarn, nylon and polyesters. As pore-forming materials there may be mentioned sodium sulphate and sodium phosphate.

The activating monomer and/or the cross-linking agent can be incorporated at other stages prior to regeneration, or the cross-linking agent may be incorporated after regeneration. Mixtures of two or more activating substances and/or cross-linking agents can be employed if desired.

The regenerated ion exchange cellulose may be prepared in any of a wide variety of physical forms as may be required. Preferred physical forms, however, for use in accordance with the invention comprise non-extended forms, in particular sponges, caps, rigid and semi-rigid porous bodies and particulate forms such as beads, granules, or powder. Other forms which may be prepared and used include film, sheet, filament, tube and rod (of any desired cross-section). Granular and powder forms can be obtained directly by an appropriate regeneration method, or indirectly by grinding of, for example, a cellulose regenerated into film form.

Furthermore, the cellulose may, if required, be regenerated into or onto a support comprising an inert material such as, for example, a rigid porous mass of ceramic material. In this way, a considerable variety of physical forms can be obtained, for example, packing for columns. Instead, after regeneration, the cellulose may be incorporated into a matrix or support, which is preferably formed of an inert material, so as to obtain special forms or structures. For example, an activated regenerated cellulose in particulate form may be incorporated into a porous bag or container made of an inert material, or into a cartridge formed of inert material and having porous end walls.

Ion exchange celluloses for use in the present invention may be prepared by methods other than the viscose process, for example, the cuprammonium and acid regeneration process.

Ion exchange materials prepared in accordance with the present invention have the ability to absorb larger ions than has generally heretofore been the case, and have relatively high exchange capacities for large ions. Accordingly, the materials can be used for a widely differing range of ions. Further, the ion exchange material is dimensionally stable, especially if partially cross-linked, and is relatively resistant to disintegration.

It is a feature of materials prepared for the practice of the present invention that, because the activating monomer is well dispersed within the cellulose when regeneration takes place, it becomes distributed uniformly throughout the precipitated cellulose formed by the regeneration step, as distinct from being concentrated mainly at the surface of the cellulose.

It will be appreciated that optimum ion exchange capacity for large molecules is not compatible with a high degree of rigidity produced by extensive cross-linking, since the cross-linking reduces the extent to which the activating substance is accessible for exchange purposes.

The ion exchange process in which the activated regenerated cellulose is used in accordance with the invention may be a purification process, for example, in the treatment of waste effluents or in the purification of water for domestic use, or may be a process for extracting valuable materials in, for example, food technology. Thus, for example, the ion exchange process may comprise extraction of proteins from waste process streams such as milk whey, soya whey, or abattoir effluent. Further, the process can be utilised in separating purified enzymes from mixed protein solutions.

The spent ion exchange material bearing an exchanged ion or ions may be treated with a view to re-use, or may itself be used as a starting material in subsequent processes.

Whilst the present invention is especially concerned with ion exchange processes using activated materials made from unsubstituted cellulose, the described activation prior to regeneration may also be used in the preparation of ion exchange cellulose from cellulose derivatives, for example, methyl cellulose, ethyl cellulose, hydroxyethyl cellulose, ethylhydroxy ethyl cellulose and allyl cellulose.

The quantity of activating monomer incorporated with the cellulose prior to regeneration may be from 10% to 80% and preferably by weight (based on the dry weight of the cellulose).

The ordinary ion exchange capacity (I.E.C.) of the regenerated cellulose utilised in the process of the invention may be in the range of from 0.1 to 2.0 meq./gm., and is conveniently in the range of about 0.45 to 1.15 meq./gm.

The degree of substitution of the cellulose with the activating monomer will depend on the ion exchange capacity sought and, moreover, the degree of substitution required to produce a material of a given capacity will depend on the nature of the particular activator used. It will be appreciated that these are matters which can readily be settled by routine experimentation. Typically, the degree of substitution will be in the range of from 0.1 to 0.3.

It will be understood that the present invention does not lie primarily in the selection or determination of any particular ion exchange process conditions or procedures, but in the appreciation that activated regenerated celluloses made as described herein are ion exchange materials having a wide range of utility.

The following Examples illustrate manufacture and utilisation of ion exchange celluloses in accordance with the invention:

EXAMPLE 1

Natural cellulose in the form of the steeping-grade pulp normally supplied to the Viscose industry was steeped in 18% (w/v) caustic soda solution, and the steeped pulp was drained and then pressed to a press ratio of 3.3. The resulting alkali cellulose, which comprised 27.5% cellulose, 15.5% caustic soda, and 75% water, was shredded in a Z-arm grinder to form crumbs.

365 Gm. of the alkali cellulose crumbs were conditioned to 5° C. in a Z-arm mixer, and 58.3 gm. N.N-diethyl 2-chloroethylamine hydrochloride were added to the cool crumbs. The resulting mass was mixed for 30 minutes at 5° C., after which time the temperature was raised to 50° C. and reaction allowed to continue for a further 60 minutes. The temperature was then reduced to 30° C. and 65 gm. carbon disulphide were added to the reacting mass. The ensuing xanthation reaction was allowed to continue for 60 minutes at 30° C., giving a diethylaminoethyl, (DEAE), cellulose xanthate having a $\gamma$ number of 89. (as will be understood by those skilled in the art, the $\gamma$ number provides a measure of the degree of substitution of the cellulose by xanthate groups).

An activated regenerated cellulose sponge was produced from the DEAE cellulose xanthate as follows:

153.5 Gm. of 18.8% (w/v) caustic soda and 802 gm. water were added to 651.4 gm. of the xanthate to yield a viscose solution. 51.5 Gm. cotton fibre as reinforcing agent and 5,500 gm. of $Na_2SO_4.10H_2O$ (Glauber's Salt) as pore-forming agent were then added to the solution, yielding a paste. The paste was extruded into small cylindrical moulds and was then regenerated in sodium sulphate solution at 95°–100° C., the concentration of $Na_2SO_4$ being 25% (w/v), to form a sponge.

An ion exchange test process was conducted as follows: A quantity of the regenerated cellulose equivalent to 1 g. dry weight was suspended in 50 ml. of 0.1 M sodium chloride and then titrated with 0.1 M hydrochloric acid. The titration was monitored with a pH meter and a graph obtained of pH against ml. acid, from which the ion exchange capacity of the cellulose for chloride ions was found to be 0.95 meq./gm.

EXAMPLE 2

DEAE cellulose xanthate was prepared as described in Example 1, and a viscose solution was prepared therefrom by treating 651.4 gm. of the xanthate with 385 gm. of 18.8% (w/v) caustic soda solution and 3415 gm. water. The viscose solution was then diluted with water in the ratio of 1 part viscose to 5 parts water. After dilution, the viscose was sprayed by means of compressed air into a regenerating solution comprising 0.5% sulphuric acid and 10% sodium sulphate. The cellulose was thereby regenerated in the form of a fine powder (200–400 mesh B.S.S.) which was washed to remove by-products.

An ion exchange test using the powdered material showed it to have an ion exchange capacity of 1.13 meq/gm.

EXAMPLE 3

A viscose solution (DEAE cellulose) was prepared as described in Example 2. A film was cast from the solution by weighing 25 gm. of the viscose onto a metal tray 6 inches square and ¼ inch deep. THe viscose was spread over the whole tray and a uniform film thickness was obtained by passing a knife over the surface. After discarding surplus viscose, the film was coagulated by immersing the tray in 30% ammonium sulphate for 20 minutes. The coagulated film was then removed from the tray and immersed for 20 minutes in 12% sulphuric acid to complete the regeneration.

After being washed to remove residual acid and salts, the film was dried and ground and exhibited an ion exchange capacity of 1.09 meq/gm. in a test process.

EXAMPLE 4

This Example illustrates simultaneous xanthation and activation in the manufacture of the ion exchange cellulose.

To 1340 gm. of CEPO powdered cellulose SS200 (made by Svenska Tramjol Sfabrikerna) contained in a Z-arm mixer was added a solution of 300 gm. caustic soda and 400 gm. N,N-diethyl 2-chloroethylamine hydrochloride in 1000 gm. water, followed immediately by 650 gm. carbon disulphide. The mass was mixed at 5° C. for 30 minutes, after which time the temperature was raised to 30° C. and the reaction was allowed to continue for a further 90 minutes at that temperature.

The DEAE cellulose xanthate product was made into viscose as described in Example 3, and an ion exchange film was produced from the viscose as described in that Example.

After drying, the film was tested as described in Example 1 and was found to have an ion exchange capacity of 0.79 meq/gm.

EXAMPLE 5

Carboxymethyl cellulose was prepared by reacting natural cellulose with caustic soda and with chloroacetic acid as activating agent. A clear viscose solution was obtained from the carboxymethyl cellulose by dispersing 100 gm. of the cellulose in 2500 gm. of 17.0% (w/v) caustic soda solution, adding 15 mls. of carbon disulphide, and tumbling the resulting mass for 2¼ hours at 25° C.

One portion of the viscose solution was regenerated as described in Example 1 to form a sponge, which displayed an ion exchange capacity of 0.46 meq/gm. in a test process, and another portion was regenerated as described in Example 3 to form a film which, after drying, exhibited an exchange capacity 0.59 meq/gm. in a test process as described in Example 1.

EXAMPLE 6

To 134 gm. of CEPO SS200 cellulose powder (Svenska) was added a solution of 50 gm. of N,N-diethyl 2-chloroethylamine hydrochloride, 30 gm. of caustic soda, 0.2 gm. epichlorhydrin and 100 gm. of water. The mass was mixed for 30 minutes at a temperature of 5° C., then raised to a temperature of 50° C. for a further 60 minutes, yielding a cross-linked DEAE cellulose.

The reaction mixture was cooled to 30° C., and 65 gm. carbon disulphide were added to initiate xanthation. Xanthation was continued for 60 minutes at 30° C. and the product was then dissolved to give a viscose solution as described in Example 2. Regeneration was then effected as described in that Example to give a fine powder which displayed an ion exchange capacity of 1.14 meq/gm. in a test process.

EXAMPLE 7

Powdered activated regenerated cellulose was prepared as described in Example 2. Post-regeneration cross-linking of the cellulose was effected by treating 100 gm. of the powder in a Z-arm mixer with a solution of 2.5 gm. epichlorohydrin, 30 gm. caustic soda, and 100 gm. water. The mass was raised to 50° C. for 20 minutes, and was then washed free of by-products to yield a cross-linked regenerated DEAE cellulose which displayed an ion exchange capacity of 1.11 meq/gm. in a test process.

EXAMPLE 8

10 gm. of DEAE cellulose produced as described in Example 1 (up to, but not including, xanthation) was dissolved in 100 ml. of commercially available Shirley Cuprammonium solution with stirring. The resulting solution was cast into a film as described in Example 3 and regenerated by treatment with sulphuric acid, yielding an activated regenerated cellulose film having an ion exchange capacity of 1.0 meq/gm. in a test process.

EXAMPLE 9

A viscose solution (DEAE cellulose) was prepared as described in Example 2, and Hydronyl LA 3032 ¼ inch porous ceramic spherical beads were saturated with the viscose solution under vacuum. The vacuum was then released, the surplus viscose drained away, and the DEAE cellulose regenerated onto the porous support by treatment with 12.5% sodium sulphate/sulphuric acid solution. The uptake of dry regenerated DEAE cellulose was 28.6% by weight, based on the dry weight of the beads.

The foregoing Examples illustrate, inter alia, the variety of physical forms in which activated regenerated cellulose can be produced for use in accordance with the invention. In order to demonstrate the superior exchange capacity for large ions of such materials, the products of certain of the Examples were tested in exchange processes as follows:

Each ion exchange material was "precycled" in known manner. ("Precycling" refers to the conventional technique of successive absorption/desorption of ions effected at continually increasing pH). After "precycling", each exchange material was suspended in 10 volumes of 0.1 M chloride-tris buffer at pH 8.35, poured into a column (30 cm. × 1.5 cm.), and washed with 0.01 M chloride-tris buffer at pH 8.35 (approximately one liter of buffer being employed) until the pH and conductivity of the column eluate were identical with those of the starting buffer.

Sufficient of the ion exchange material (0.5–1.0 gn. dry weight was then stirred with 700–800 mg. of bovine serum albumin in 75 ml. of the same buffer. Small samples (1–3 ml.) were withdrawn at intervals, centrifuged, and the albumin content was estimated spectrophotometrically (280 nm).

The test procedure was carried out on the powder produced in Example 2, on the films produced in Example 3 and 4, and on the cross-linked material produced in Example 7. In order to provide a basis for comparison with the products of the invention, the procedure was repeated using Whatman DE-52 and a sample of the activated (DEAE) natural cellulose produced by the steps described in Example 1 up to, but not including, xanthation. Whatman DE-52 is a mercerised, crystalline, cross-linked natural cellulose.

The results of the investigations are shown in the following Table, from which the superior properties of the products obtained by the pre-regeneration activation used in practising the present invention is clearly evident.

| Ion exchange material | Albumin capacity (mg/gm) |
| --- | --- |
| Example 2 | 928 |
| Example 3 | 798 |
| Example 4 | 480 |
| Example 7 | 366 |
| Whatman DE-52 | 313 |
| Activated natural cellulose | 288 |

EXAMPLE 10

This Example illustrates the removal of soya proteins from soya whey.

An aqueous slurry of 20 g. wet weight regenerated carboxymethyl cellulose (made by a process involving pregeneration activation) was stirred into 100 cc. of soya whey having a protein concentration of 72 g./l. The pH of the resulting slurry was adjusted to 4.0 and was then maintained substantially constant for a period of 30 minutes, after which the slurry was centrifuged and the supernatant liquid analysed for protein content. The analysis showed that 89% of the initial protein content of the soya whey had been removed by the carboxymethyl cellulose ion exchange material.

EXAMPLE 11

The pH of 100 cc. of rennet whey (protein concentration 8.6 g./l.) was adjusted to 9.0 with dilute sodium hydroxide. 30 g. of regenerated diethylaminoethyl (DEAE-) cellulose (which may be made, for instance, by the process described in Example 1), was then added to the whey and the whole was stirred for 30 minutes. Analysis showed that the protein content of the whey had been reduced to 1.4 g./l., representing an 83% protein uptake by the regenerated DEAE- cellulose.

EXAMPLE 12

Example 11 was repeated using acid whey, and a similar protein uptake was achieved.

It will be appreciated that rennet whey and acid whey are each milk wheys.

EXAMPLE 13

100 g. wet weight of regenerated DEAE- cellulose were added to 900 cc. of an abattoir effluent containing 0.5% protein. The pH of the resulting slurry was adjusted to 9.0 and the whole was stirred for 30 minutes. The supernatant liquid remaining after centrifuging contained only 0.10 g./l. protein, representing 98% removal by the cellulose.

It will be appreciated that the protein uptake obtained in any particular case can be varied by altering the relative proportion of protein/ion exchange cellulose.

We claim:

1. In a process for removing an organic polyelectrolyte from an aqueous solution of the polyelectrolyte, which comprises binding the polyelectrolyte by ion-exchange means to a cellulosic ion-exchange material, the improvement which comprises;

employing as the ion exchange cellulose material, one made by reacting unregenerated cellulose with a monomeric substance having at least one ionisable chemical group which imparts ion exchange properties to the cellulose reaction product, and thereafter regenerating the activated cellulose reaction product to yield an activated regenerated cellulose having ion exchange properties.

2. The process of claim 1, in which the ion exchange cellulose is a cross-linked material.

3. The process of claim 2, wherein the cross-linking is effected simultaneously with the reaction of said monomeric substance with the unregenerated cellulose.

4. The process of claim 2, wherein the cellulose is a material cross-linked to the extent of from 0.1 to 10%.

5. The process of claim 1, wherein the ion exchange cellulose has an ion exchange capacity in the range of from 0.46 to 1.14 meq/g.

6. The process of claim 1, wherein the quantity of monomeric substance incorporated with the unregenerated cellulose is in the range of from 10 to 80% by weight.

7. The process of claim 1 wherein the ion exchange cellulose has been regenerated into a non-particulate form which has been ground into powder or granular form before use.

8. The process of claim 1, wherein the polyelectrolyte is a proteinaceous material.

9. The process of claim 1, wherein the ion exchange cellulose is in a non-extended physical form selected from the group consisting of particulate forms, caps and porous bodies.

10. The process of claim 1, in which said unregenerated cellulose is an alkali cellulose.

11. The process of claim 10, in which said alkali cellulose is in the form of crumbs or powder.

12. The process of claim 1 in which the ion exchange cellulose is in the form selected from the group consisting of film, sheet, filament, rod, tube and sponge.

13. An ion-exchange cellulose material, which comprises; the activated cellulose obtained on regeneration of the product obtained upon etherifying unregenerated cellulose with a monomeric substance having at least one ionisable chemical group which imparts ion exchange properties, said substance being selected from the group consisting of monochloroacetic acid and N,N-diethyl-2-chloroethylamine hydrochloride.

* * * * *